United States Patent
Tokura et al.

(10) Patent No.: US 8,208,812 B2
(45) Date of Patent: Jun. 26, 2012

(54) OPTICAL RELAY DEVICE AND OPTICAL RELAY TRANSMISSION SYSTEM

(75) Inventors: Toshiyuki Tokura, Tokyo (JP); Katsuhiro Shimizu, Tokyo (JP); Kazuyuki Ishida, Tokyo (JP); Kuniaki Motoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 821 days.

(21) Appl. No.: 12/299,065

(22) PCT Filed: May 25, 2006

(86) PCT No.: PCT/JP2006/310477
§ 371 (c)(1),
(2), (4) Date: Oct. 30, 2008

(87) PCT Pub. No.: WO2007/138649
PCT Pub. Date: Dec. 6, 2007

(65) Prior Publication Data
US 2010/0239263 A1  Sep. 23, 2010

(51) Int. Cl.
*H04J 14/02* (2006.01)
(52) U.S. Cl. ............... 398/94; 398/37; 398/97
(58) Field of Classification Search .......... 398/31, 398/34, 37–38, 94, 97
See application file for complete search history.

(56) References Cited

U.S. PATENT DOCUMENTS

| | | | |
|---|---|---|---|
| 6,256,140 B1 * | 7/2001 | Kobayashi | 359/341.3 |
| 6,657,778 B1 | 12/2003 | Motoshima et al. | |
| 6,873,456 B2 * | 3/2005 | Motoshima et al. | 359/337.11 |
| 7,170,673 B2 * | 1/2007 | Motoshima et al. | 359/337.12 |
| 7,463,829 B2 * | 12/2008 | Uda et al. | 398/97 |
| 7,680,419 B2 * | 3/2010 | Nakashima et al. | 398/177 |
| 2005/0099676 A1 * | 5/2005 | Tokura et al. | 359/349 |
| 2005/0286898 A1 * | 12/2005 | Okuno | 398/92 |
| 2006/0050751 A1 * | 3/2006 | Sakamoto | 372/32 |
| 2006/0127101 A1 * | 6/2006 | Maeda et al. | 398/160 |
| 2007/0053650 A1 * | 3/2007 | Shimada et al. | 385/140 |

FOREIGN PATENT DOCUMENTS

| | | |
|---|---|---|
| JP | 6 21897 | 1/1994 |
| JP | 9 83489 | 3/1997 |
| JP | 2809132 | 7/1998 |
| JP | 10 303821 | 11/1998 |
| JP | 2914334 | 4/1999 |
| JP | 3068500 | 5/2000 |
| JP | 3070482 | 5/2000 |

(Continued)

OTHER PUBLICATIONS

Japanese Office Action issued Jan. 25, 2011, in Patent Application No. 2008-517714 (with English-language translation).

(Continued)

*Primary Examiner* — Dzung Tran
(74) *Attorney, Agent, or Firm* — Oblon, Spivak, McClelland, Maier & Neustadt, L.L.P.

(57) ABSTRACT

A control-target-value setting unit sets a control target value corresponding to the number of multiplexed wavelengths measured by a number-of-multiplexed-wavelengths measuring unit. A controller controls the variable optical attenuator based on the control target value. An optical amplifier performs an optical amplification with a constant gain regardless of power of a wavelength-multiplexed light. The controller performs feedback control of the variable optical attenuator such that a result of measurement of the total power of the wavelength-multiplexed light coincides with the control target value.

19 Claims, 6 Drawing Sheets

FOREIGN PATENT DOCUMENTS

| | | |
|---|---|---|
| JP | 2000 349717 | 12/2000 |
| JP | 2001 53682 | 2/2001 |
| JP | 2001 197010 | 7/2001 |
| JP | 3268605 | 1/2002 |
| JP | 3306712 | 5/2002 |
| JP | 2003 289166 | 10/2003 |
| JP | 3511241 | 1/2004 |
| JP | 2004 111724 | 4/2004 |
| JP | 2004 147122 | 5/2004 |
| JP | 2004 296581 | 10/2004 |
| JP | 2005 141099 | 6/2005 |
| JP | 2005 294854 | 10/2005 |
| JP | 2006 33889 | 2/2006 |
| JP | 2006 101470 | 4/2006 |
| WO | WO 2006/035493 A1 | 4/2006 |

OTHER PUBLICATIONS

"Erbium-Doped Fiber Amplifiers: Principles and Applications", (E Desurvire, ISBN 0-471-58977-2, John Wiley & Sons, Inc., p. 482 (1994).

* cited by examiner

OPTICAL RELAY DEVICE AND OPTICAL RELAY TRANSMISSION SYSTEM

TECHNICAL FIELD

The present invention relates to an optical relay device that optically amplifies signal light transmitted through an optical fiber or the like, and an optical relay transmission system employing the optical relay device.

BACKGROUND ART

Typically, an optical relay transmission system performs control to absorb fluctuations or changes of loss in an optical fiber and to keep predetermined power of light in the optical fiber to maintain a satisfactory transmission performance, even when the loss fluctuates according to ambient temperatures, vibrations, or bends of an optical fiber between relay stations, or in each of a transmission station, a relay station, and a reception station.

When the optical relay transmission system is a wavelength-multiplexing transmission system, optical power in each of wavebands to be multiplexed needs to be kept at a predetermined value. For example, in Patent Document 1 below, a technology is disclosed that enables to control total power of a wavelength-multiplexed light in an optical fiber to have a value corresponding to the number of multiplexed wavelengths.

Patent Document 1: Japanese Patent Application Laid-open No. H6-21897

DISCLOSURE OF INVENTION

Problem to be Solved by the Invention

In the technology disclosed in Patent Document 1, however, accuracy in amplitude of a control signal to be superimposed on a signal with each wavelength is a factor of a control error for the optical power. Accordingly, the optical power may fluctuate transiently when the number of multiplexed wavelengths is changed.

Control over the optical power by an optical amplifier is usually accompanied by change in wavelength characteristics of amplifier gain. Therefore, deviations in optical power occur among signal light at different wavelengths, which makes it difficult to maintain predetermined power of light at all wavelengths.

The present invention has been achieved in view of the above problems, and an object of the present invention is to provide an optical relay device and an optical relay transmission system that can keep optical power within a predetermined level with high accuracy, and assure a satisfactory transmission performance, without causing transient fluctuates in optical power at each wavelength in an optical fiber as a light transmission line even when loss in the optical fiber fluctuates or the number of multiplexed wavelengths changes.

Means for Solving Problem

To solve the problems and achieve the object mentioned above, according to an aspect of the present invention, an optical relay device that relays a wavelength-multiplexed light in which optical signals with different wavelengths are wavelength-multiplexed, the optical relay device includes a total-power measuring unit that measures total power of the wavelength-multiplexed light; a number-of-multiplexed-wavelengths measuring unit that measures number of multiplexed wavelengths of the optical signals included in the wavelength-multiplexed light; a variable optical attenuator that attenuates the total power of the wavelength-multiplexed light; a control-target-value setting unit that sets a control target value corresponding to the number of multiplexed wavelengths, based on the number of multiplexed wavelengths measured by the number-of-multiplexed-wavelengths measuring unit; a controller that controls the variable optical attenuator based on the control target value; and an optical amplifier that performs an optical amplification with a constant gain regardless of power of the wavelength-multiplexed light, wherein the controller performs feedback control of the variable optical attenuator such that a result of measurement of the total power of the wavelength-multiplexed light meets the control target value.

EFFECT OF THE INVENTION

According to the optical relay device of the present invention, the feedback control over the variable optical attenuator is performed such that a result of the measurement of total power of the wavelength-multiplexed light in which a plurality of optical signals with different wavelengths are multiplexed coincides with the control target value for the total power, set according to the number of multiplexed wavelengths. Therefore, even when loss in an optical fiber as an optical transmission line fluctuates or the number of multiplexed wavelengths changes, the optical power can be maintained within a predetermined level with high accuracy, and a satisfactory transmission performance can be assured, without causing transient fluctuations in optical power at each wavelength in the optical fiber.

Figure 1:
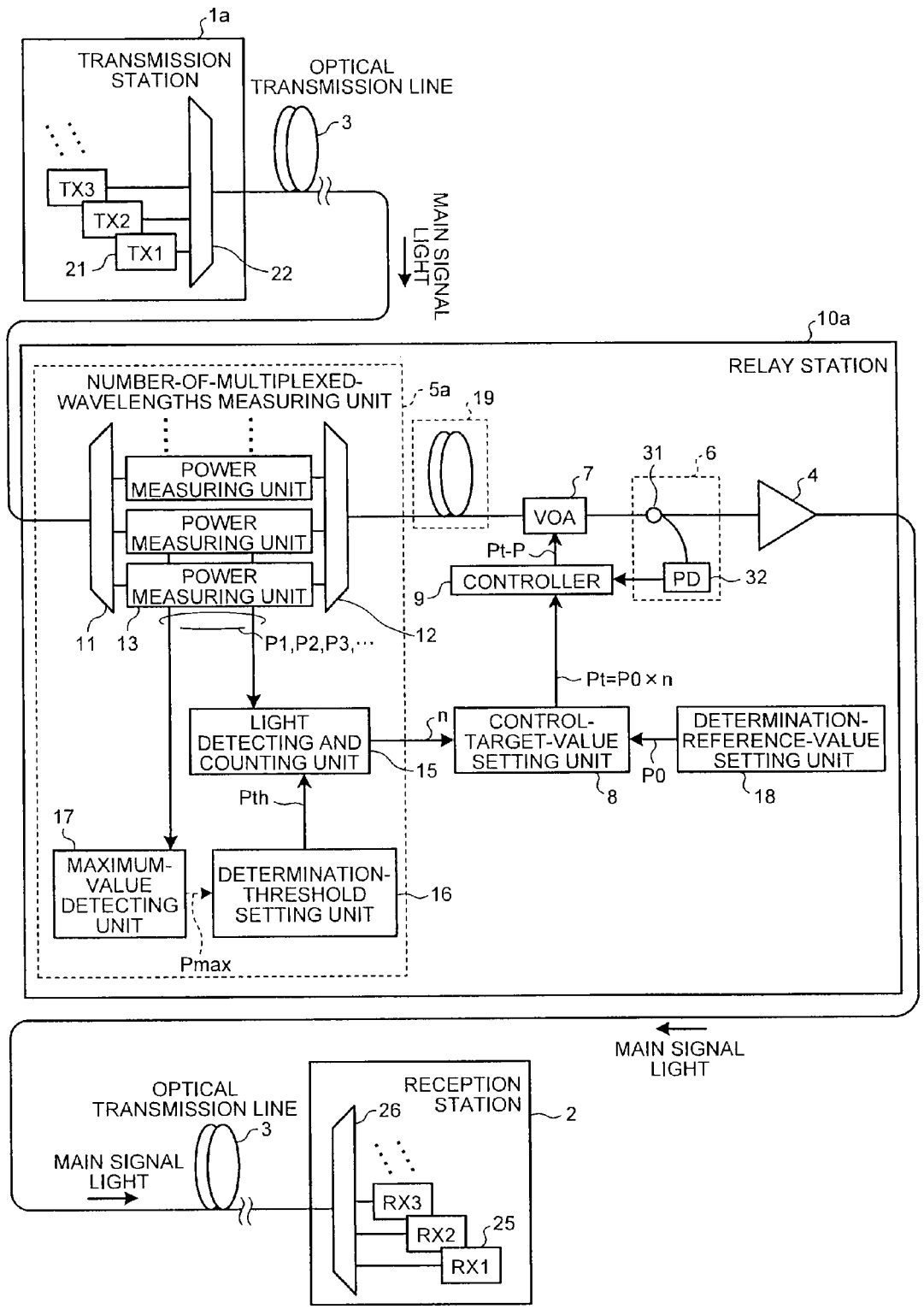
FIG. 1 is a schematic diagram of a configuration of an optical relay transmission system according to a first embodiment of the present invention.

EXPLANATIONS OF LETTERS OR NUMERALS 1a, 1b, 1c transmission station
2 reception station
3 optical transmission line
4 optical amplifier
5a, 5b, 5c, 5d, 5e number-of-multiplexed-wavelengths measuring unit
6 wavelength-multiplexed-light total-power measuring unit
7 variable optical attenuator
8 control-target-value setting unit
9 controller
10a, 10b, 10c, 10d, 10e relay station 11, 26 demultiplexer
12, 22 multiplexer
13 power measuring unit
14 branching coupler
15 light detecting and counting unit
16 determination-threshold setting unit
17 maximum-value detecting unit
18 determination-reference-value setting unit
19 transmission delay unit
20 modulation-component extracting unit
21, 42 optical transmitter
23, 27 modulating unit
24, 28 oscillator
25, 41 optical receiver
29a, 29b optical switch
31, 37 optical coupler
32, 38 PD (Photo Diode)
36 wavelength-multiplexed-light total-power converter

BEST MODE(S) FOR CARRYING OUT THE INVENTION

Exemplary embodiments of an optical relay device and an optical relay transmission system according to the present invention will be explained below in detail with reference to the accompanying drawings. The present invention is not limited thereto.

First Embodiment

FIG. 1 is a schematic diagram of a configuration of an optical relay transmission system according to a first embodiment of the present invention. The optical relay transmission system shown in FIG. 1 includes a transmission station 1a, a relay station 10a, and a reception station 2. The transmission station 1a and the relay station 10a, and the relay station 10a and the reception station 2 are connected through an optical transmission line 3, which is an optical fiber for example, respectively.

The transmission station 1a includes a plurality of optical transmitters (TX1, TX2, TX3, . . . ) 21 that output optical signals having different wavelengths, and a multiplexer 22 that multiplexes light output from the optical transmitters 21. An arrayed waveguide grating (AWG), a filter-type wavelength multiplexer, or a wavelength-independent optical coupler can be used as the multiplexer 22. Some of these multiplexers can be combined to realize the multiplexer 22.

The reception station 2 includes a demultiplexer 26 that demultiplexes light into optical signals having different wavelengths, and optical receivers (RX1, RX2, RX3, . . . ) 25 that receive light demultiplexed by the demultiplexer 26, respectively. An AWG, a filter-type wavelength demultiplexer, or a combination of a wavelength-independent optical coupler and an optical filter that allows only light at specific wavelengths to pass through can be used as the demultiplexer 26. Some of these demultiplexers can be combined to realize the demultiplexer 26.

The relay station 10a includes an optical amplifier 4, which is a typical constituent element for compensating transmission loss in an optical fiber. On an input side (upstream) of the optical amplifier 4, a number-of-multiplexed-wavelengths measuring unit 5a, a transmission delay unit 19, a variable optical attenuator (VOA) 7, and a wavelength-multiplexed-light total-power measuring unit 6 are provided. In addition, a control-target-value setting unit 8, a determination-reference-value setting unit 18, and a controller 9 that control attenuation performed by the VOA 7 are provided.

The optical amplifier 4 is a constituent element for compensating loss in the optical transmission line 3, or loss generated in each element of the relay station 10a. In many cases, an erbium-doped fiber (EDF) that can optically amplify a wavelength-multiplexed light directly is used.

The number-of-multiplexed-wavelengths measuring unit 5a includes a demultiplexer 11 that demultiplexes light into optical signals having different wavelengths, power measuring units 13 each measuring power of each light demultiplexed by the demultiplexer 11, a multiplexer 12 that re-multiplexes the light demultiplexed by the demultiplexer 11, a light detecting and counting unit 15 that determines whether light is present in a transmission waveband and counts the number of lights based on results of the measurement by the power measuring units 13, a maximum-value detecting unit 17 that detects a maximum value among the results of the measurement by the power measuring units 13, and a determination-threshold setting unit 16 that sets a threshold to be assigned to the light detecting and counting unit 15 based on a result of the detection by the maximum-value detecting unit 17. An AWG, a filter-type wavelength demultiplexer, or other type of demultiplexer can be used as the demultiplexer 11, like the demultiplexer 26 in the reception station 2. An AWG, a filter-type wavelength multiplexer, or a wavelength-independent optical coupler can be used as the multiplexer 12, like the multiplexer 22 in the transmission station 1a. The power measuring unit 13 can be realized by branching part of input light, and inputting the branched light into a photo diode (PD) (not shown), thereby outputting an electrical signal (current signal) proportional to the optical power.

The transmission delay unit 19 can be configured by using an optical fiber with a predetermined length, or the like. The transmission delay unit 19 is a constituent element for delaying arrival time of an optical signal to be input to the VOA 7. The transmission delay unit 19 elongates propagation time from when the number of multiplexed wavelengths is measured until a variable attenuation is controlled, thereby substantially reducing time required for the measurement. For example, assuming that the length of an optical fiber is 100 kilometers and the propagation velocity of light is $3 \times 10^8$ (m/s), time of about 0.3 milliseconds is required before light output from the number-of-multiplexed-wavelengths measuring unit 5a reaches the VOA 7. This produces an equivalent effect to a case in which measurement time for the number of multiplexed wavelengths is reduced by about 0.3 milliseconds, which enables to set a time constant used for controlling the VOA 7 to a smaller value and to absorb a fluctuation of loss in a faster transmission path. When a dispersion-compensating fiber is used as the transmission delay unit 19, it is possible to compensate dispersion in the optical transmission line and to delay the optical signal. The transmission delay unit 19 is not an essential constituent element but can be used if required.

The VOA 7 is a constituent element that adjusts power by properly attenuating a wavelength-multiplexed light. To provide this function, various types of components can be used, such as one that changes an attenuation based on a magneto-optical effect produced by coil current, one that changes an attenuation according to an amount of bend provided to an optical fiber, one that changes an attenuation by mechanically shifting an optical path, and one that changes an attenuation by adjusting a tilting angle of a compact mirror called "micro electro mechanical system (MEMS)".

The wavelength-multiplexed-light total-power measuring unit 6 includes an optical coupler 31 and a photo diode (PD) 32. Light branched by the optical coupler 31 is detected by the PD 32, thereby enabling to output an electrical signal (current signal) proportional to the total power.

For ease of explanation, only one relay station 10*a* is provided in the configuration shown in FIG. 1. However, in many cases, a plurality of the optical transmission lines 3 and the relay stations 10*a* are alternately arranged. Also in these cases, the operations and functions of the constituent elements are the same. The optical transmission lines 3 and the relay stations each including the optical amplifier 4 are connected, thereby configuring a transmission path of an optical relay transmission system.

A general operation of the optical relay transmission system as shown in FIG. 1 is explained next. In FIG. 1, a plurality of light at different wavelengths output from the optical transmitters 21 is multiplexed by the multiplexer 22, and is output from the transmission station 1*a* as a wavelength-multiplexed light. The wavelength-multiplexed light output from the transmission station 1*a* reaches the relay station 10*a* through the optical transmission line 3. The wavelength-multiplexed light having reached the relay station 10*a* is compensated for transmission loss and output toward the reception station 2. The wavelength-multiplexed light output from the relay station 10*a* reaches the reception station 2 through the optical transmission lines 3 and a plurality of relay stations. The wavelength-multiplexed light having reached the reception station 2 is demultiplexed by the demultiplexer 26 into light at different wavelengths, and guided to the optical receivers 25, resulting in desired reception signals.

An operation of the relay station 10*a* is explained next. In the number-of-multiplexed-wavelengths measuring unit 5*a* of the relay station 10*a*, the demultiplexer 11 demultiplexes the wavelength-multiplexed light. Each of the demultiplexed light is input to the power measuring unit 13 to individually measure optical power (P1, P2, P3, . . . ) at each wavelength. Light having passed through the power measuring units 13 is multiplexed by the multiplexer 12 and output from the number-of-multiplexed-wavelengths measuring unit 5*a* as a wavelength-multiplexed light again. In the power measuring unit 13, branched light that is part of the light output toward the multiplexer 12 is input to a PD, for example, thereby obtaining an electrical signal proportional to the optical power, as already mentioned. The determination-threshold setting unit 16 sets a determination threshold Pth for determining whether light is present in advance.

The light detecting and counting unit 15 determines whether light is present in each waveband based on whether the measurement result (P1, P2, P3, . . . ) of the optical power is larger or smaller than the determination threshold Pth. For example, in an optical transmission system in which intervals of assigned wavelengths in a wavelength-multiplexed light are equally spaced, a transmitted wavelength-multiplexed light is demultiplexed by the demultiplexer 11 into light at wavelengths at equally-spaced intervals. During the operation, however, light at all the assigned wavelengths is not always transmitted, but light at some of the wavelengths is arbitrarily used. Accordingly, the light detecting and counting unit 15 according to the first embodiment determines whether light at each wavelength is present, and counts the number of the wavelengths determined to be present, thereby calculating the number n of multiplexed wavelengths. Even when the wavelengths of light that is subjected to wavelength multiplexing are at equal frequency intervals or at irregular intervals having no rule, the same process can be performed except that the corresponding demultiplexer 11 is adopted.

As the determination threshold Pth output from the determination-threshold setting unit 16 to the light detecting and counting unit 15, a fixed value or a variable value can be set. The determination threshold Pth can be properly selected according to conditions of the system. For example, the maximum-value detecting unit 17 obtains a maximum value Pmax of the optical power (P1, P2, P3, . . . ) measured by the power measuring unit 13 (=max(P1, P2, P3, . . . ). A power value (Pmax/A) that is obtained by reducing the maximum value by a preset ratio A (A is a positive real number that is equal to or larger than 1) can be used as the determination threshold Pth for determining whether light is present. These processes enable to determine whether light corresponding to the optical power of the wavelength-multiplexed light is present. Therefore, it is possible to correctly determine whether light is present even when the optical power is generally low. The counted number n of multiplexed wavelengths is transmitted to the control-target-value setting unit 8.

The above processes performed by the light detecting and counting unit 15, the determination-threshold setting unit 16, and the maximum-value detecting unit 17 can be realized by hardware. However, when a controller such as a microcomputer is provided, these functions can be realized by software.

Output from the multiplexer 12 is input to the VOA 7 through the transmission delay unit 19. The VOA 7 provides appropriate attenuation to the input wavelength-multiplexed light based on a control signal (Pt-P) output from the controller 9. The wavelength-multiplexed-light total-power measuring unit 6 measures total power of the wavelength-multiplexed light, and inputs a resultant electrical signal (current signal) to the controller 9. The optical amplifier 4 optically amplifies the wavelength-multiplexed light, and outputs the amplified light to a relay station or a reception station downstream.

Power control for the wavelength-multiplexed light is explained. The power control indicates control of attenuation provided by the VOA 7, and is performed by the controller 9 to keep optical power P measured by the wavelength-multiplexed-light total-power measuring unit 6 constant. The control-target-value setting unit 8 sets a control target value Pt to be assigned to the controller 9 as Pt=P0×n, using a reference value P0 held in the determination-reference-value setting unit 18 and the measurement result n obtained by the number-of-multiplexed-wavelengths measuring unit 5*a* (the light detecting and counting unit 15). With respect to the control target value Pt, the attenuation provided by the VOA 7 is adjusted by a control loop (feedback loop) of: the wavelength-multiplexed-light total-power measuring unit 6→the controller 9→the VOA 7→the wavelength-multiplexed-light total-power measuring unit 6 such that a deviation (Pt-P) approaches zero. When a target value proportional to the number of multiplexed wavelengths is set according to the number of multiplexed wavelengths, it is possible to keep constant optical power per wavelength. In normal time when the number of multiplexed wavelengths does not change, the control is performed such that the result P of the optical power measurement becomes constant with respect to the constant control target value Pt. Therefore, fluctuations of the loss in the transmission path are absorbed, and thus the power of the wavelength-multiplexed light in the optical transmission line 3 is kept constant.

When the control technique as described in Patent Document 1, which enables to detect a control signal superimposed on signal light at each wavelength to obtain total power, is applied for example, the degree of modulation on the superimposed control signal will affect the accuracy in the total power measurement. Therefore, the conventional technique is disadvantageous in terms of accuracy as compared with the technique according to the first embodiment, which enables to directly measure the total power by the wavelength-multiplexed-light total-power measuring unit 6.

There is another technique that enables to calculate average power based on powers at a plurality of wavelengths and the number of multiplexed wavelengths, and to perform control to maintain constant average power (see, for example, Japanese Patent Application Laid-open No. H09-162476). However, the technique according to the first embodiment is superior in terms of simplicity because division is not required.

To maintain optical power at all multiplexed wavelengths within a predetermined range, wavelength dependency of amplifier gain should preferably be as small as possible. This is described in a relevant part of the following document, for example.

"Erbium-Doped Fiber Amplifiers: Principles and Applications" (E. Desurvire, ISBNO-471-58977-2, John Wiley & Sons, Inc., 1994), p. 482, 11. 22 to 23

Also in the relay station 10a according to the first embodiment, it is appropriate that the optical amplifier 4 should maintain constant gain (hereinafter, "constant-gain maintaining control"). In view of this, according to the present invention, the control of power is primarily performed by the VOA 7 without providing the optical amplifier 4 with functions of adjusting or controlling power. When the optical amplifier 4 adjusts optical power, change of gain do not follow instant change of input light power due to a time constant inherent to an amplification medium such as an EDF. Consequently, output light power overshoots, which causes a transient fluctuation in the optical power. The constant-gain maintaining control over the optical amplifier 4 is also effective in avoiding such an optical power fluctuation. For this reason, the present invention uses the VOA 7 to control optical power, instead of the optical amplifier 4. In Patent Document 1 mentioned above, the measurement time needs to be longer to measure optical power more correctly because accuracy in the amplitude of the control signal to be superimposed on light at each wavelength becomes a factor of a control error in optical power. However, in the technique according to the first embodiment, total optical power is directly measured, and therefore the measurement can be achieved with high accuracy in a short time.

A control operation performed when the number of multiplexed wavelengths changes, which is one of characteristics of the present invention, is explained. When the number of multiplexed wavelengths changes, the number-of-multiplexed-wavelengths measuring unit 5a measures the change, and then the control-target-value setting unit 8 promptly changes the control target value Pt, thereby continuously controlling the attenuation provided by the VOA 7. At that time, the time constant (hereinafter, "variable-optical-attenuation controlling time constant (VOA-controlling time constant)") Tc associated with the control loop over the attenuation performed by: the wavelength-multiplexed-light total-power measuring unit 6→the controller 9→the VOA 7→the wavelength-multiplexed-light total-power measuring unit 6 is set longer than a time period (hereinafter, "multiplexed-wavelength-number measurement time") Tn required for the measurement of the number of multiplexed wavelengths. This is one of the characteristics of the present invention. Accordingly, the attenuation provided by the VOA 7 is not changed uselessly before the control target value Pt is changed according to the change in the number n of multiplexed wavelengths. The control target value Pt will be changed before long, and thus the optical power per wavelength does not transiently fluctuate greatly. In this way, the control that enables to absorb the change in the number of multiplexed wavelengths is achieved.

There is a control technique, for example, that enables to monitor change in the number of multiplexed wavelengths, and, when the monitored number of wavelengths changes, notify of the change in advance through a monitoring system to temporarily stop control over attenuation by a VOA, thereby avoiding a fluctuation of optical power per wavelength when the number of multiplexed wavelengths changes (for example, see Japanese Patent No. 3306712). In this control technique, a configuration of a relay station can be simplified; however, the control over the VOA needs to be stopped exceptionally from when information on the number of multiplexed wavelengths is notified until a process associated with the change in the number of multiplexed wavelengths is completed. Therefore, fluctuations of loss in the transmission path during the period cannot be handled. The control target value for the VOA cannot be changed in time with respect to accidental change of the number of multiplexed wavelengths that cannot be recognized by the whole system, such as omission of some wavelengths due to failure of some transmitters, and omission of optical fibers. Therefore, constant optical power per wavelength cannot be maintained.

On the other hand, according to the first embodiment, the relay station 10a measures the number of multiplexed wavelengths within the wavelength-multiplex-number measurement time Tn, which is a relatively shorter time, and promptly changes the control target value Pt for controlling the VOA 7 when the number of multiplexed wavelengths changes. Furthermore, the VOA-controlling time constant Tc for controlling the VOA 7 is set larger than the multiplexed-wavelength-number measurement time Tn required for measurement of the optical total power. Accordingly, constant optical power per wavelength can be kept even in the case of accidental change in the number of multiplexed wavelengths, without instantaneously changing the attenuation provided by the VOA 7 uselessly. Loss fluctuation occurring in a shorter time than the multiplexed-wavelength-number measurement time Tn cannot be absorbed; however, in the case of a slower loss fluctuation than the measuring time Tn, change in the number of multiplexed wavelengths can be handled without exception also when the loss occurs immediately before or after the change in the number of multiplexed wavelengths. When the transmission delay unit 19 described above is used, it implies that the VOA-controlling time constant Tc is reduced equivalently by the delay time provided by the transmission delay unit 19, which enhances the efficiency in speed of the constant optical-power control.

When the VOA-controlling time constant Tc is set to a value larger than and as close as possible to the multiplexed-wavelength-number measurement time Tn, transient power fluctuations occurring at the change in the number of multiplexed wavelengths may have some impact. However, when the time constant for the control is temporarily changed to a larger value than the usual value Tc upon detection of the change in the number of multiplexed wavelengths, or when the transmission delay unit 19 is used, such power fluctuations can be reduced.

As described above, the relay station 10a according to the first embodiment directly measures total power of the wavelength-multiplexed light, and controls the VOA according to the result of the measurement. Therefore, the constant optical-power control can be achieved with high accuracy. At that time, the control target value for the total power is set according to the number of multiplexed wavelengths, and thus optical power per wavelength can be kept at a predetermined level regardless of the number of multiplexed wavelengths.

In the relay station 10a according to the first embodiment, also when light at some wavelengths does not reach or light at additional wavelengths reaches, for example, and thus the number of multiplexed wavelengths abruptly changes, the number of multiplexed wavelengths is measured in a short time, and then the control target value for the total power is changed. The multiplexed-wavelength-number measurement time is set to a smaller value than the VOA-controlling time constant. Therefore, the transient fluctuation of optical power in each waveband can be prevented. With this configuration, the constant total-power control by the VOA works effectively also immediately before or after the change in the number of multiplexed wavelengths. Accordingly, fluctuations of loss in the transmission path can be also absorbed, thereby maintaining predetermined optical power.

Second Embodiment

Figure 2:
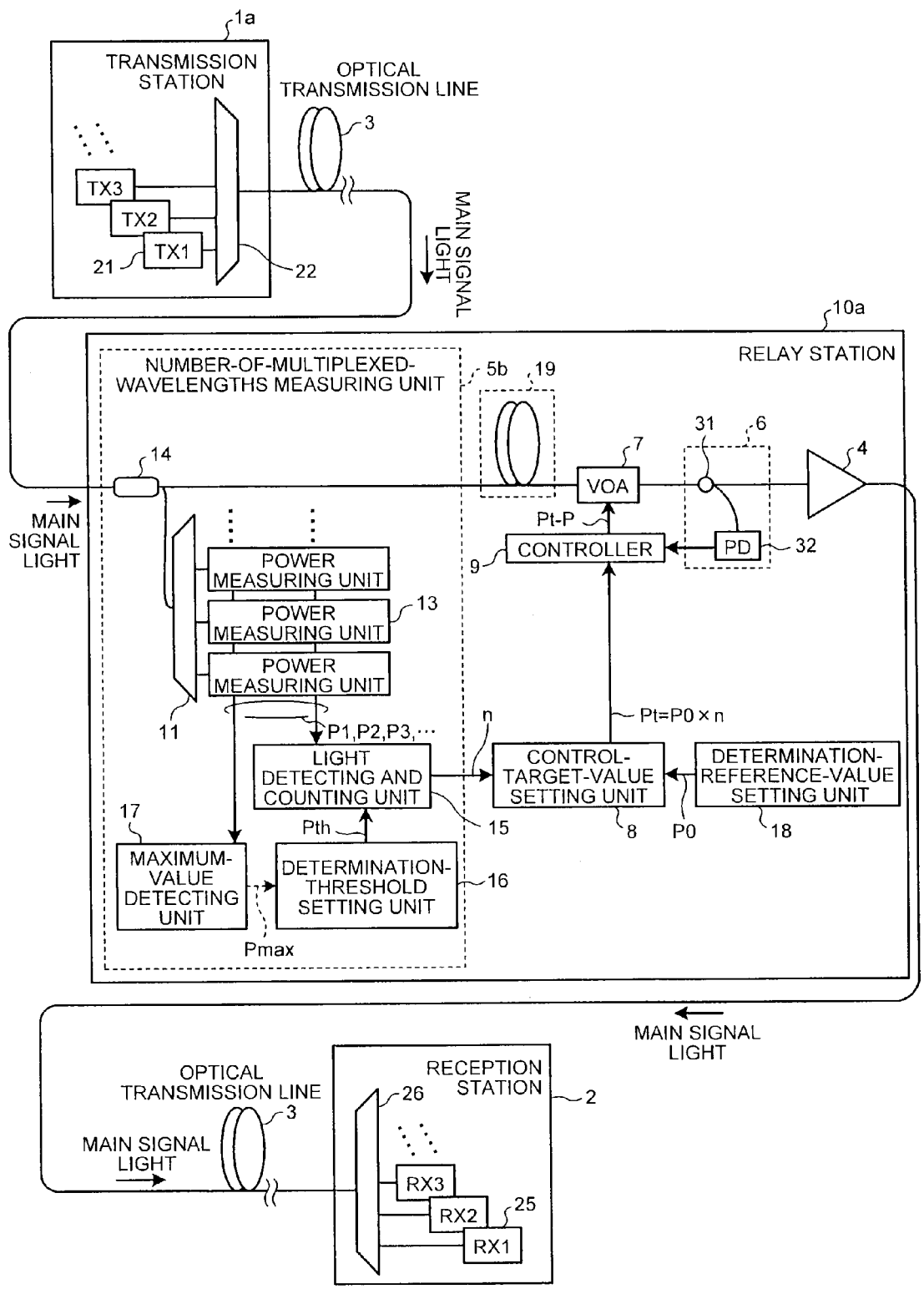
FIG. 2 is a schematic diagram of a configuration of an optical relay transmission system according to a second embodiment of the present invention.

FIG. 2 is a schematic diagram of a configuration of an optical relay transmission system according to a second embodiment of the present invention. The optical relay transmission system as shown in FIG. 2 includes a number-of-multiplexed-wavelengths measuring unit 5b, instead of the number-of-multiplexed-wavelengths measuring unit 5a that performs multiplexing after measuring optical power in each waveband as shown in FIG. 1. The number-of-multiplexed-wavelengths measuring unit 5b can measure optical power in each waveband without performing multiplexing after demultiplexing. Constituent elements associated with a transmission station and a reception station, and constituent elements of the number-of-multiplexed-wavelengths measuring unit other than constituent elements for measuring optical power are the same as or equivalent to those in the first embodiment as described with reference to FIG. 1. These constituent elements are denoted by the same reference numerals, and explanations thereof will be omitted. In the following explanations, functions and operations different from those according to the first embodiment are mainly described.

The number-of-multiplexed-wavelengths measuring unit 5b as shown in FIG. 2 guides partial power of a wavelength-multiplexed light to the demultiplexer 11 through a branching coupler 14. When an optical coupler having a branching ratio of 15 dB or 20 dB is used for the branching coupler 14, loss in light that is output from the number-of-multiplexed-wavelengths measuring unit 5b to the transmission delay unit 19 can be reduced. The light output from the branching coupler 14 can be connected to the transmission delay unit 19. Therefore, there is no need to provide the multiplexer 12, like in the number-of-multiplexed-wavelengths measuring unit 5a according to the first embodiment as shown in FIG. 1.

A unit similar to the demultiplexer 11 as shown in FIG. 1 can be used for the demultiplexer 11. A unit as same as the power measuring unit 13 shown in FIG. 1 can be used for the power measuring unit 13. Functions of the light detecting and counting unit 15, the determination-threshold setting unit 16, and the maximum-value detecting unit 17 are similar to those described with reference to in FIG. 1. With respect to the general function of the number-of-multiplexed-wavelengths measuring unit, the number-of-multiplexed-wavelengths measuring unit 5b is different from the number-of-multiplexed-wavelengths measuring unit 5a in that the number-of-multiplexed-wavelengths measuring unit 5b does not cause a wavelength-multiplexed light to pass through by demultiplexing and multiplexing the light but cause the wavelength-multiplexed light to pass through at low loss, and counts the number of multiplexed wavelengths using branched output from the branching coupler 14. However, the number-of-multiplexed-wavelengths measuring unit 5b is fundamentally the same as the number-of-multiplexed-wavelengths measuring unit 5a in the function of measuring the number n of multiplexed wavelengths.

Thus, a relay station 10b according to the second embodiment directly measures total power of multiplexed-wavelength light, and controls the VOA based on the measurement result, like in the case as described with reference to FIG. 1. Therefore, the constant optical-power control can be achieved with high accuracy. At that time, the control target value for the total power is set according to the number of multiplexed wavelengths, and thus the optical power per wavelength can be maintained at a predetermined level regardless of the number of multiplexed wavelengths.

In the relay station 10b according to the second embodiment, also when light at some wavelengths does not reach or light at additional wavelengths reaches, and thus the number of multiplexed wavelengths abruptly changes, for example, the number of multiplexed wavelengths is measured in a short time, and then the control target value for the total power is changed. Furthermore, the multiplexed-wavelength-number measurement time is set smaller than the VOA-controlling time constant. Accordingly, transient fluctuations of optical power in each waveband can be prevented. With this configuration, the constant total-power control by the VOA works effectively also immediately before or after the change in the number of multiplexed wavelengths. Therefore, fluctuations of loss in the transmission path are also absorbed, and thus predetermined optical power can be maintained.

Furthermore, the relay station 10b according to the second embodiment does not need the multiplexer 12, unlike the number-of-multiplexed-wavelengths measuring unit 5a according to the first embodiment described with reference to FIG. 1. Therefore, the configuration of the relay station 10b can be simplified.

Third Embodiment

Figure 3:
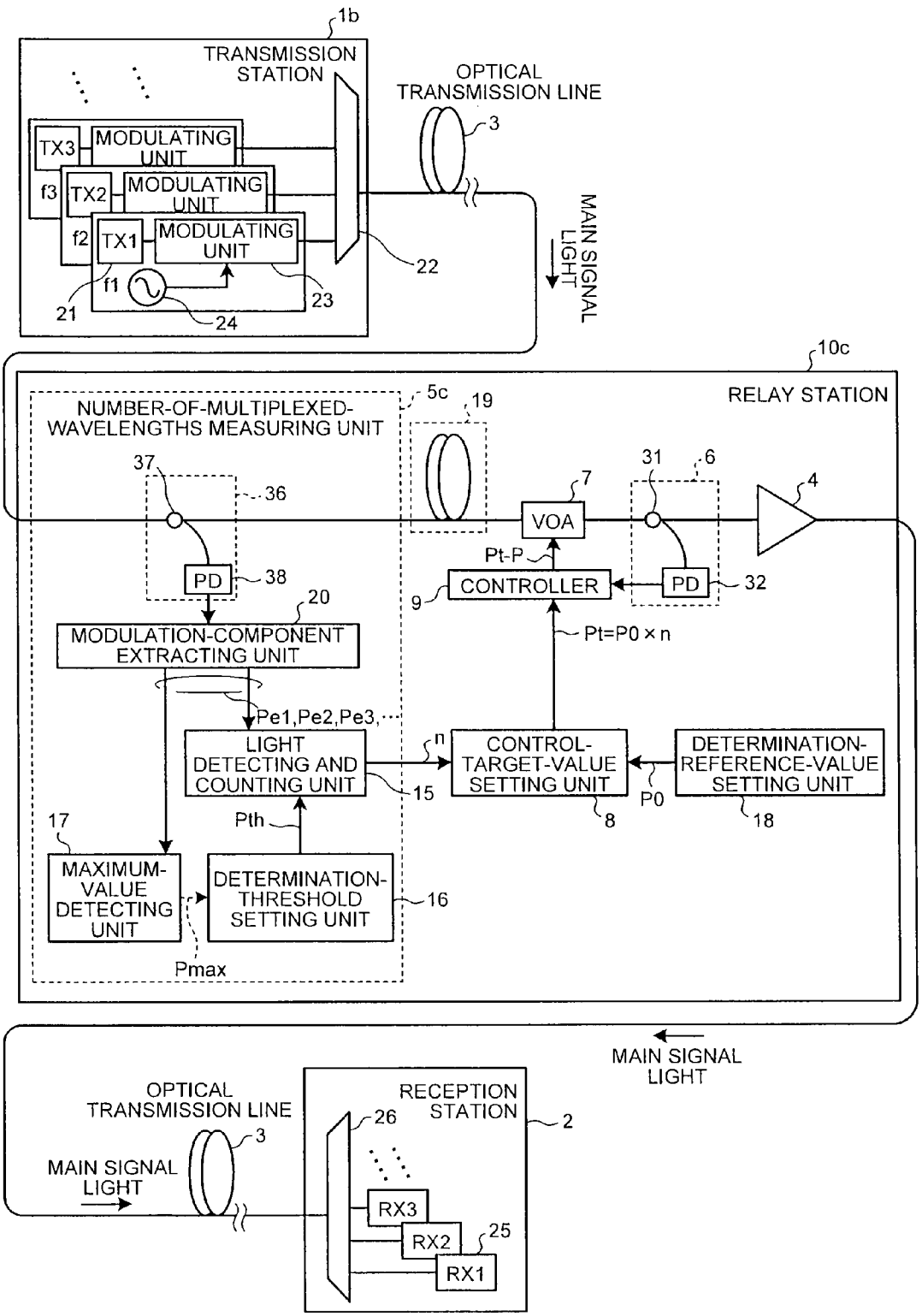
FIG. 3 is a schematic diagram of a configuration of an optical relay transmission system according to a third embodiment of the present invention.

FIG. 3 is a schematic diagram of a configuration of an optical relay transmission system according to a third embodiment of the present invention. In FIG. 3, the optical transmission line 3 and the reception station 2 have the same configurations as those in the first or second embodiment, and thus explanations thereof will be omitted. A transmission station 1b shown in FIG. 3 includes modulating units 23 that modulate the light output from the optical transmitters 21 with frequencies f (f1, f2, f3, . . . ) generated by oscillators 24. With this configuration, light intensity in a plurality of wavebands is modulated with the different frequencies f (f1, f2, f3, . . . ), respectively. The modulation factor needs to be small enough to avoid effect on transmission performance of the main signal, and thus is set to about 5%, for example. The modulated light is multiplexed by the multiplexer 22. Multiplexed light becomes light output from the transmission station 1b, and transmitted through the optical transmission line 3.

A configuration, a function, and the like of a relay station 10c are explained. In the relay station 10c shown in FIG. 3, configurations, functions, and the like of the transmission delay unit 19, the VOA 7, the wavelength-multiplexed-light total-power measuring unit 6, the optical amplifier 4, the controller 9, the control-target-value setting unit 8, and the determination-reference-value setting unit 18 are the same as or equivalent to those shown in FIG. 2. Therefore, explanations thereof will be omitted. In a number-of-multiplexed-wavelengths measuring unit 5c, a wavelength-multiplexed-light total-power converter 36 converts total power of a wavelength-multiplexed light into an electrical signal (current signal). The wavelength-multiplexed-light total-power converter 36 is realized by the same function as that of the wavelength-multiplexed-light total-power measuring unit 6. The electrical signal output from the wavelength-multiplexed-light total-power converter 36 includes a component of modulation by the modulating unit 23, and a modulation-component extracting unit 20 extracts the modulation component. To extract components of intensity modulation with the frequency, electrical signal power Pe (Pe1, Pe2, Pe3, . . . ) corresponding to optical power P (P1, P2, P3, . . . ) can be obtained by branching a wavelength-multiplexed light into a plurality of lights, and then measuring intensity of light passing through a bandpass filter at the frequency f (f1, f2, f3, . . . ), for example. Alternatively, it is possible to measure the passing intensity while sweeping a frequency band including the frequency f (f1, f2, f3, . . . ) using a bandpass filter having a variable passing frequency.

It is possible to determine whether light is present in each waveband by comparing intensity of the electrical signal power Pe (Pe1, Pe2, Pe3, . . . ) thus obtained and a fixed determination threshold Pth set in advance. The maximum-value detecting unit 17 calculates a maximum value Pmax (=max(P1, P2, P3, . . . ) with respect to the electrical signal power Pe (Pe1, Pe2, Pe3, . . . ) obtained by the modulation-component extracting unit 20, and then a power value (Pmax/A) is obtained by reducing the maximum value by a preset ratio A (A is a positive real number that is equal to or larger than 1). The power value (Pmax/A) thus obtained can be used as the determination threshold Pth for determining whether light is present. These processes enable to determine whether light corresponding to optical power of the wavelength-multiplexed light is present, like in the case described with reference to FIG. 1 or 2. Therefore, even when optical power is generally low, it is possible to correctly determine whether the light is present. The counted number n of multiplexed wavelengths is transmitted to the control-target-value setting unit 8. Like in the case as described with reference to FIG. 1 or 2, processes performed by the light detecting and counting unit 15, the determination-threshold setting unit 16, and the maximum-value detecting unit 17 can be realized by hardware or software.

A relation in magnitude among a time constant $T_{AGC}$ for controlling gain of the optical amplifier 4, a reciprocal 1/f of the modulation frequency f (f1, f2, f3, . . . ), the multiplexed-wavelength-number measurement time Tn required by the number-of-multiplexed-wavelengths measuring unit 5c, and the VOA-controlling time constant Tc for controlling the attenuation provided by the VOA 7 is explained.

First, the reciprocal 1/f indicating a cycle of the modulation frequency f (f1, f2, f3, . . . ) is set larger than the time constant $T_{AGC}$ for controlling gain of the optical amplifier 4. This setting enables the modulation component of the frequency f (=f1, f2, f3, . . . ) to pass through the optical amplifier 4. Accordingly, when a plurality of the relay stations 10c are connected to the optical transmission line 3, it is possible to cause the modulation component to reach the second and subsequent relay stations 10c. If the reciprocal 1/f of the modulation frequency f (f1, f2, f3, . . . ) is smaller than the time constant $T_{AGC}$ for controlling the gain of the optical amplifier 4, the control over the gain of the optical amplifier 4 does not follow at each modulation frequency, and constant gain cannot be maintained. Therefore, in such a case, amplitude of the modulation component attenuates, and thus it is impossible to cause satisfactory amplitude of the modulation component to reach the second and subsequent relay stations 10c.

The multiplexed-wavelength-number measurement time Tn required by the number-of-multiplexed-wavelengths measuring unit 5c is larger than the reciprocal 1/f of the modulation frequency f (f1, f2, f3, . . . ). The reason why there is such a relation therebetween is that longer time than the cycle 1/f of the modulation component is required in principle for determining whether light is present in each waveband according to detection of the modulation component.

Furthermore, the VOA-controlling time constant Tc for controlling the attenuation provided by the VOA 7 is set larger than the multiplexed-wavelength-number measurement time Tn required by the number-of-multiplexed-wavelengths measuring unit 5c. This setting delays the time of the VOA control loop performed by the wavelength-multiplexed-light total-power measuring unit 6→the controller 9→the VOA 7→the wavelength-multiplexed-light total-power measuring unit 6, compared to the time required for the measurement of the number of multiplexed wavelengths. Therefore, transient fluctuations of optical power at each wavelength can be prevented, like in the example as described with reference to FIG. 1 or 2.

Thus, the time constant $T_{AGC}$ for controlling the gain of the optical amplifier 4, the reciprocal 1/f of the modulation frequency f (f1, f2, f3, . . . ), the multiplexed-wavelength-number measurement time Tn required by the number-of-multiplexed-wavelengths measuring unit 5c, and the VOA-controlling time constant Tc for controlling the attenuation provided by the VOA 7 have a relation in magnitude of: $T_{AGC} < 1/f < Tn < Tc$.

As described above, in the relay station 10c as shown in FIG. 3, the number-of-multiplexed-wavelengths measuring unit 5c according to the third embodiment directly measures the total power of the wavelength-multiplexed light, and controls the VOA based on the measurement result, like in the relay station 10a as shown in FIG. 1, or the relay station 10b as shown in FIG. 2. Therefore, the constant optical-power control can be achieved with high accuracy. At that time, the control target value for the total power is set according to the number of multiplexed wavelengths, and thus the optical power per wavelength can be maintained at a predetermined level regardless of the number of multiplexed wavelengths.

In the relay station 10c according to the third embodiment, also when light at some wavelengths does not reach or light at additional wavelengths reaches, and the number of multiplexed wavelengths abruptly changes, the number of multiplexed wavelengths is measured in a short time, and then the control target value for the total power is changed. In addition, the multiplexed-wavelength-number measurement time is set to a smaller value than the VOA-controlling time constant. Therefore, transient fluctuations of the optical power in each waveband can be prevented. With this configuration, the constant total-power control by the VOA works effectively also immediately before or after change in the number of multiplexed wavelengths. Therefore, fluctuations of loss in the transmission path are also absorbed, and thus predetermined optical power can be kept.

The third embodiment describes an example in which light intensity in each waveband is modulated. However, the third embodiment is not limited to intensity modulation; however, any means adapted to perform modulation such as frequency modulation and phase modulation can be used. In any case, the same effect as in the case of the intensity modulation can be obtained.

Fourth embodiment

Figure 4:
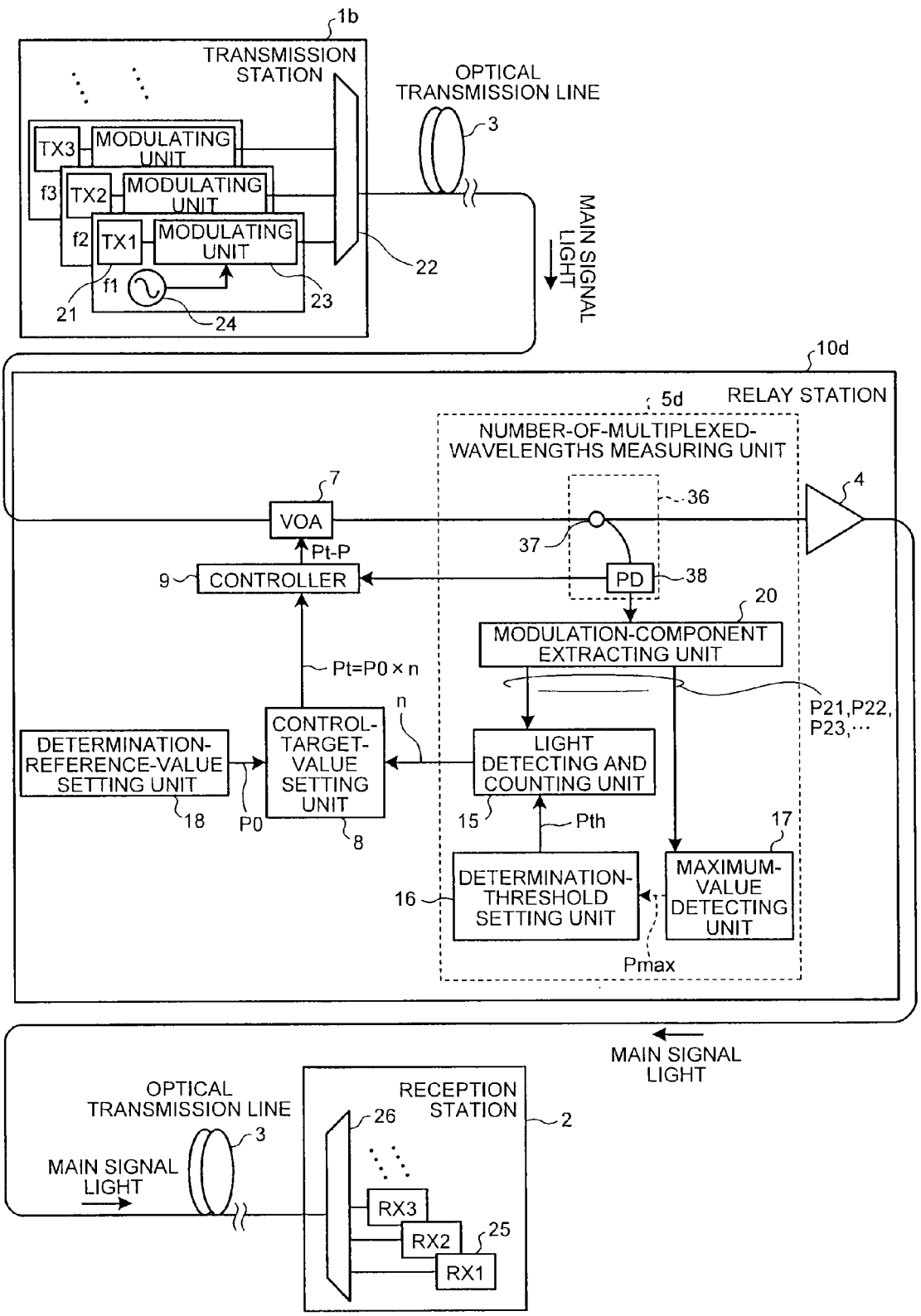
FIG. 4 is a schematic diagram of a configuration of an optical relay transmission system according to a fourth embodiment of the present invention.

FIG. 4 is a schematic diagram of a configuration of an optical relay transmission system according to a fourth embodiment of the present invention. In the optical relay transmission system shown in FIG. 4, the number-of-multiplexed-wavelengths measuring unit 5c that measures the number of multiplexed wavelengths upstream of the VOA 7 (with respect to a direction of transmission of the wavelength-multiplexed optical signal) as shown in FIG. 3 is replaced with a number-of-multiplexed-wavelengths measuring unit 5d that measures the number of multiplexed wavelengths downstream of the VOA 7. The functions of the wavelength-multiplexed-light total-power measuring unit 6 and the wavelength-multiplexed-light total-power converter 36 shown in FIG. 3 can be provided in common to the wavelength-multiplexed-light total-power converter 36 in the configuration according to the fourth embodiment. Therefore, in the configuration as shown in FIG. 4, the output from the wavelength-multiplexed-light total-power converter 36 is transmitted to the controller 9 and the modulation-component extracting unit 20. The configurations of the transmission station and the reception station, and the configuration for controlling the variable attenuator are the same as or equivalent to those according to the third embodiment as shown in FIG. 3. Therefore, these constituent elements are denoted by the same reference numerals, and explanations thereof will be omitted.

As described above, in a relay station 10d shown in FIG. 4, the output of the wavelength-multiplexed-light total-power converter 36 is transmitted to the controller 9 to control the VOA 7. The modulation-component extracting unit 20 operates to measure the number of multiplexed wavelengths based on the output from the wavelength-multiplexed-light total-power converter 36. Other operations of the relay station 10d are the same as those of the relay station 10c as shown in FIG. 3.

Therefore, the relay station 10d according to the fourth embodiment directly measures the total power of the wavelength-multiplexed light, and controls the VOA based on the measurement result, like the relay station 10c as shown in FIG. 3. Therefore, the constant optical-power control can be achieved with high accuracy. At that time, the control target value for the total power is set according to the number of multiplexed wavelengths, and thus the optical power per wavelength can be kept at a predetermined level regardless of the number of multiplexed wavelengths.

In the relay station 10d according to the fourth embodiment, also when light at some wavelengths does not reach or light at additional wavelengths reach, and thus the number of multiplexed wavelengths abruptly changes, the number of multiplexed wavelengths is measured in a short time, and then the control target value for the total power is changed. In addition, the multiplexed-wavelength-number measurement time is set to a smaller value than the VOA-controlling time constant. Therefore, transient fluctuations of the optical power in each waveband can be prevented. With this configuration, the constant total-power control by the VOA works effectively even immediate before or after change of the number of multiplexed wavelengths. Accordingly, fluctuations of loss in the transmission path are also absorbed, and therefore predetermined optical power can be maintained.

In the relay station 10d according to the fourth embodiment, both of the functions of the wavelength-multiplexed-light total-power measuring unit 6 and the wavelength-multiplexed-light total-power converter 36 in the relay station 10c as shown in FIG. 3 can be realized only by the wavelength-multiplexed-light total-power converter 36 in the number-of-multiplexed-wavelengths measuring unit 5c. Therefore, the configuration of the relay station 10d can be simplified.

The fourth embodiment describes an example in which light intensity in each waveband is modulated. However, the present embodiment is not limited to the intensity modulation, and any means adapted to perform modulation such as frequency modulation and phase modulation can be applied. In any case, the same effect as in the case of the intensity modulation is obtained.

Fifth Embodiment

Figure 5:
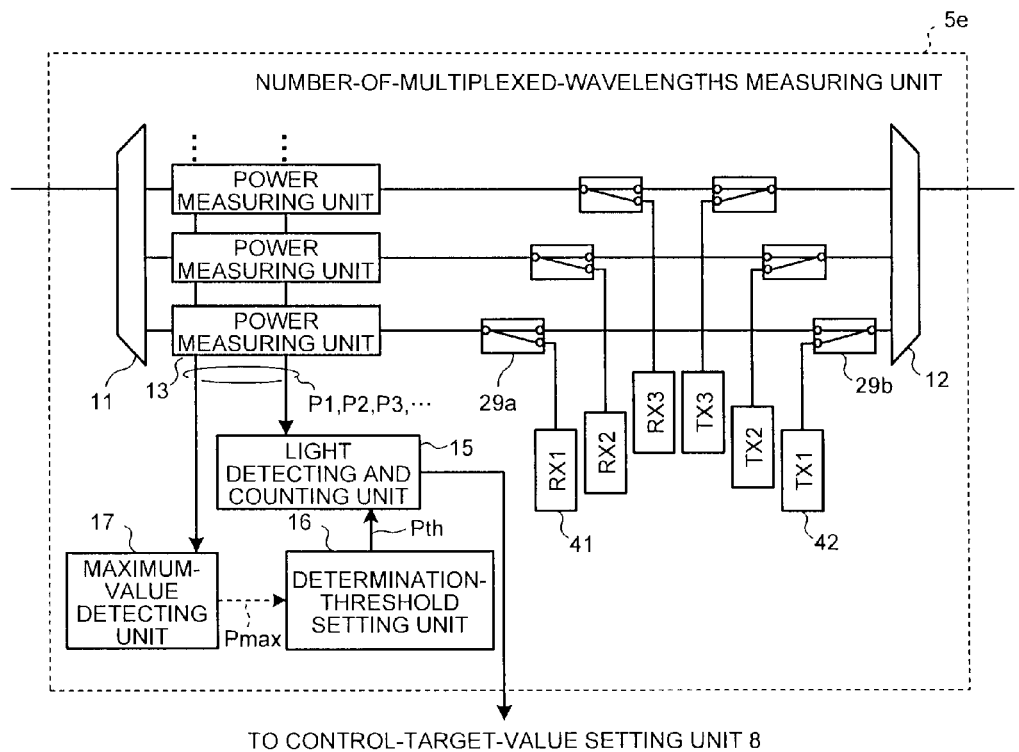
FIG. 5 is a schematic diagram of a configuration of a number-of-multiplexed-wavelengths measuring unit according to a fifth embodiment of the present invention.

FIG. 5 is a schematic diagram of a configuration of a number-of-multiplexed-wavelengths measuring unit according to a fifth embodiment. The configuration in which the transmission station and the reception station are located on only both ends of the optical relay transmission system, respectively, is shown in FIG. 1 or 2. However, the present invention is effective also in a transmission system having an optical add-drop multiplex (OADM) configuration that enables to input light to optical receivers in a relay station, guide light to a different transmission path, or add light from optical transmitters immediately after the power measuring unit 13, thereby extracting only light at some wavelengths immediately before or after the power measuring unit 13. As an example of such a transmission system, FIG. 5 depicts a modification of the number-of-multiplexed-wavelengths measuring unit 5a in the relay station 10a in the configuration as shown in FIG. 1.

In FIG. 5, optical switches 29a and 29b are arranged between the power measuring units 13 and the multiplexer 12. The optical switch 29a is used to select an output path, and can switch whether to cause light to go straight to output the light to a path leading to the multiplexer 12, or to branch the light to output branched light to an optical receiver 41. On the other hand, the optical switch 29b is used to select an input path, and can select whether to input light from the optical switch 29a, or to input light from an optical transmitter 42.

In the example as shown in FIG. 5, the optical receiver 41 and the optical transmitter 42 are connected to the optical switches 29a and 29b, respectively. However, the optical receiver 41 can be replaced by an optical fiber leading to another transmission path, or the optical transmitter 42 can be replaced by an optical fiber from another transmission path.

Furthermore, it is also possible to provide only one of the optical switches 29a and 29b. An appropriate configuration is selected according to individual transmission systems.

Furthermore, the optical switches 29a and 29b can be placed between the demultiplexer 11 and the power measuring units 13. An appropriate configuration is selected according to the transmission system.

As described above, the total power of the wavelength-multiplexed light is directly measured, and the VOA is controlled based on the measurement result, by providing the relay station 10a as shown in FIG. 1, or the like, with the number-of-multiplexed-wavelengths measuring unit 5e according to the fifth embodiment. Therefore, the constant optical-power control can be achieved with high accuracy. At that time, the control target value for the total power is set according to the number of multiplexed wavelengths, and thus the optical power per wavelength can be kept at a predetermined level regardless of the number of multiplexed wavelengths.

Furthermore, in the fifth embodiment, also when light at some wavelengths does not reach or light at additional wavelengths reaches, and thus the number of multiplexed wavelengths abruptly changes, the number of multiplexed wavelengths is measured in a short time, and then the control target value for the total power is changed. In addition, the multiplexed-wavelength-number measurement time is set to a value smaller than the VOA-controlling time constant. Therefore, transient fluctuations of optical power in each waveband are prevented. With this configuration, the constant total-power control by the VOA works effectively even immediately before or after the change in the number of multiplexed wavelengths. Accordingly, fluctuations of loss in the transmission path are also absorbed, and thus predetermined optical power can be maintained.

Sixth Embodiment

Figure 6:
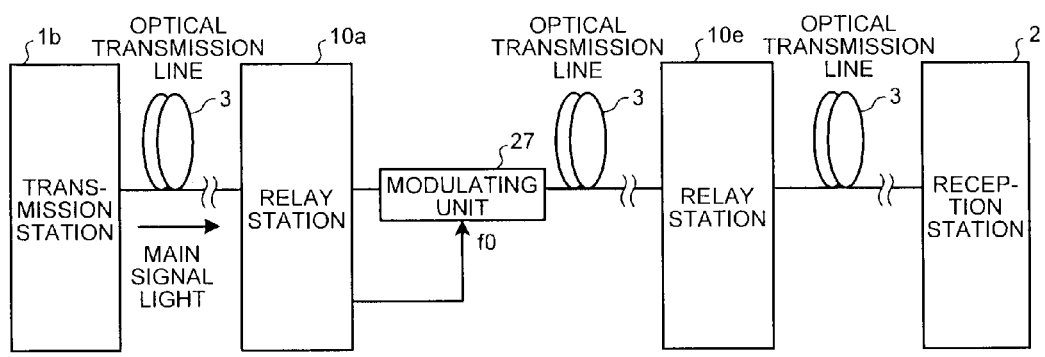
FIG. 6 is a schematic diagram of a configuration of an optical relay transmission system according to a sixth embodiment of the present invention.

FIG. 6 is a schematic diagram of a configuration of an optical relay transmission system according to a sixth embodiment of the present invention. In FIG. 6, configurations of the transmission station 1b, the optical transmission lines 3, and the reception station 2 are the same as or equivalent to those as shown in FIG. 3. A configuration of the relay station 10a is the same as or equivalent to that as shown in FIG. 1. However, a modulating unit 27 that has a function of modulating intensity of power of a wavelength-multiplexed light with a frequency f0 immediately upon detection of change in the number of multiplexed wavelengths is added on an output side (downstream side) of the relay station 10a. On the other hand, a relay station 10e includes a function of detecting the modulation component f0 added by the modulating unit 27, in addition to the same configuration and function as those of the relay station 10c shown in FIG. 3. When the modulation component f0 is detected by the relay station 10e, the time constant for controlling the VOA 7 (VOA-controlling time constant Tc) is temporarily changed to a value larger than usual, thereby minimizing fluctuations of optical power. With this operation, even when the time required for the measurement by the number-of-multiplexed-wavelengths measuring unit 5d in the relay station 10e is longer, the modulation component from the relay station 10a having a smaller measurement time is detected, and thus a fluctuation of optical power can be effectively reduced.

In the configuration as shown in FIG. 6, the modulating unit 27 is provided outside the relay station 10a; however, the modulating unit 27 can be provided inside the relay station 10a.

As described above, the optical relay transmission system according to the sixth embodiment directly measures total power of a wavelength-multiplexed light, and controls the VOA based on the measurement result. Therefore, the constant optical-power control can be achieved with high accuracy. At that time, the control target value for the total power is set according to the number of multiplexed wavelengths, and thus the optical power per wavelength can be maintained at a predetermined level regardless of the number of multiplexed wavelengths.

In the optical relay transmission system according to the sixth embodiment, also when light at some wavelengths does not reach or light at additional wavelengths reaches, and thus the number of multiplexed wavelengths abruptly changes, for example, the number of multiplexed wavelengths is measured in a short time, and then the control target value for the total power is changed. In addition, the multiplexed-wavelength-number measurement time is set to a value smaller than the VOA-controlling time constant. Therefore, transient fluctuations of optical power in each waveband are prevented. With this configuration, the constant total-power control by the VOA effectively works even immediately before or after the change of the number of multiplexed wavelengths. Accordingly, fluctuations of loss in the transmission path are also absorbed, and thus predetermined optical power can be maintained.

When the relay station 10e detects the modulation component f0, the optical relay transmission system according to the sixth embodiment operates to temporarily change the time constant for controlling the VOA 7 (VOA-controlling time constant Tc) to a value larger than usual, thereby minimizing fluctuations of optical power. Therefore, even when the time required for the measurement by the number-of-multiplexed-wavelengths measuring unit 5d in the relay station 10e is long, the modulation component from the relay station 10a having a shorter measurement time is detected, and thus fluctuations of optical power can be effectively suppressed.

The sixth embodiment describes an example in which light intensity of the wavelength-multiplexed light is modulated. However, the sixth embodiment is not limited to the intensity modulation, and any means adapted to perform modulation such as frequency modulation and phase modulation can be applied. In any case, the same effect as that in the case of the intensity modulation is obtained.

Seventh Embodiment

Figure 7:
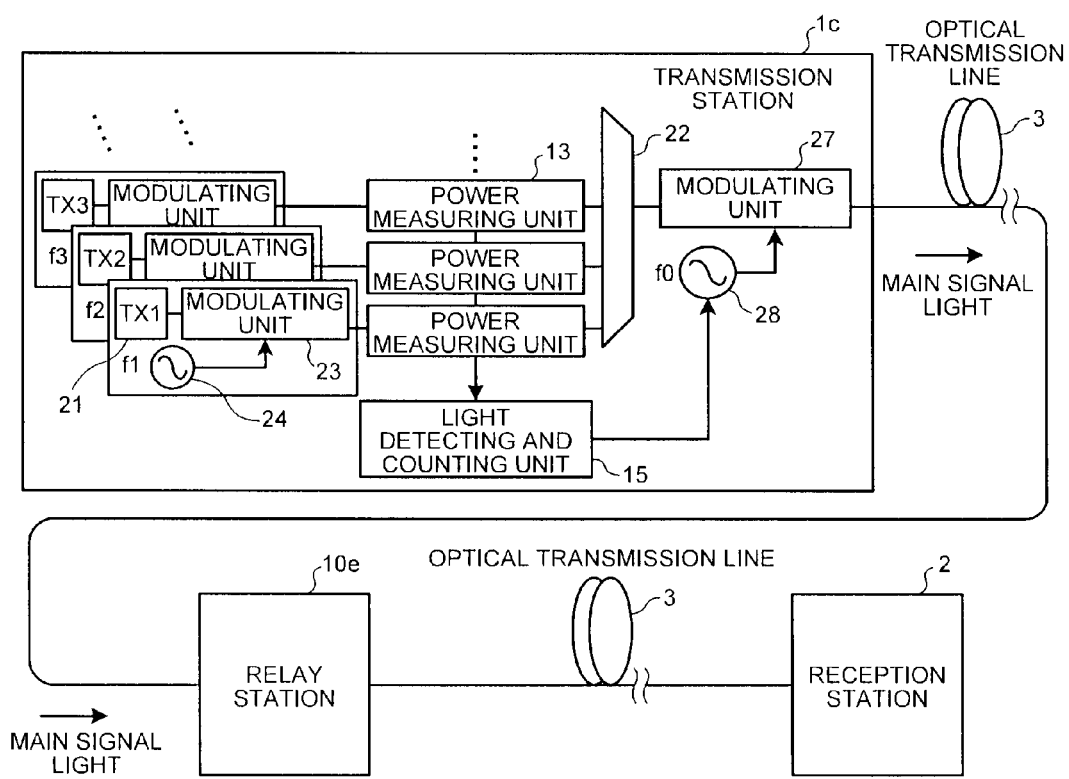
FIG. 7 is a schematic diagram of a configuration of an optical relay transmission system according to a seventh embodiment of the present invention.

FIG. 7 is a schematic diagram of a configuration of an optical relay transmission system according to a seventh embodiment of the present invention. As shown in FIG. 7, a transmission station 1c can be obtained by adding the power measuring units 13, the light detecting and counting unit 15, an oscillator 28, and the modulating unit 27 to the transmission station 1b as shown in FIG. 3. The functions of the power measuring units 13 and the light detecting and counting unit 15 are the same as or equivalent to the functions of those included in the number-of-multiplexed-wavelengths measuring unit 5a as shown in FIG. 1. The relay station 10e has the function of detecting the modulation component f0, like in the example as shown in FIG. 6.

In FIG. 7, the modulating unit 27 performs intensity modulation of the wavelength-multiplexed light with the frequency f0 generated by the oscillator 28. When the relay station 10e detects the modulation component f0, the time constant for controlling the VOA 7 (VOA-controlling time constant Tc) is temporarily changed to a value larger than usual, thereby minimizing fluctuations of optical power. With this operation, even when the time required for the measurement by the number-of-multiplexed-wavelengths measuring unit 5d in the relay station 10e is longer, the fluctuations of optical power can be effectively reduced by detecting the modulation component added by the transmission station 1c.

As described above, in the optical relay transmission system according to the seventh embodiment, total power of the wavelength-multiplexed light is directly measured, and the VOA is controlled based on the measurement result. Therefore, the constant optical-power control can be achieved with high accuracy. At that time, the control target value for the total power is set according to the number of multiplexed wavelengths, and thus the optical power per wavelength can be maintained at a predetermined level regardless of the number of multiplexed wavelengths.

In the optical relay transmission system according to the seventh embodiment, also when light at some wavelengths does not reach or light at additional wavelengths reaches, and thus the number of multiplexed wavelengths abruptly changes, for example, the number of multiplexed wavelengths is measured in a short time, and then the control target value for the total power is changed. In addition, the multiplexed-wavelength-number measurement time is set to a value smaller than the VOA-controlling time constant. Therefore, transient fluctuations of optical power in each waveband are prevented. With this configuration, the constant total-power control by the VOA works effectively even immediately before or after the change of the number of multiplexed wavelengths. Accordingly, fluctuations of loss in the transmission path are also absorbed, and thus predetermined optical power can be maintained.

In the optical relay transmission system according to the seventh embodiment, the modulating unit 27 performs intensity modulation of the wavelength-multiplexed light with the frequency f0 generated by the oscillator 28. When the relay station 10e detects the modulation component f0, the time constant for controlling the VOA 7 (VOA-controlling time constant Tc) is temporarily changed to a value larger than usual, thereby minimizing fluctuations of optical power. Therefore, even when the time required for the measurement by the number-of-multiplexed-wavelengths measuring unit $5d$ in the relay station $10e$ is longer, fluctuations of optical power can be effectively reduced by detecting the modulation component added in the transmission station $1c$.

The seventh embodiment describes an example in which the light intensity of the wavelength-multiplexed light is modulated. However, the seventh embodiment is not limited to the intensity modulation, and any means adapted to perform modulation such as frequency modulation and phase modulation can be applied. In any case, the same effect as in the case of the intensity modulation is obtained.

Industrial Applicability

As described above, the present invention is useful for an optical relay device that amplifies signal light transmitted through an optical fiber, or the like, and an optical relay transmission system that uses such an optical relay device.

The invention claimed is:

1. An optical relay device that relays a wavelength-multiplexed light in which optical signals with different wavelengths are wavelength-multiplexed, the optical relay device comprising:
   a total-power measuring unit that measures total power of the wavelength-multiplexed light;
   a number-of-multiplexed-wavelengths measuring unit that measures number of multiplexed wavelengths in the wavelength-multiplexed light;
   a variable optical attenuator that attenuates the total power of the wavelength-multiplexed light;
   a control-target-value setting unit that sets a control target value corresponding to the number of multiplexed wavelengths measured by the number-of-multiplexed-wavelengths measuring unit;
   a controller that controls the variable optical attenuator based on the control target value; and
   an optical amplifier that performs an optical amplification with a constant gain regardless of power of the wavelength-multiplexed light, wherein
   the controller performs feedback control of the variable optical attenuator such that a result of measurement of the total power of the wavelength-multiplexed light meets the control target value,
   the total-power measuring unit is arranged between the variable optical attenuator and the optical amplifier,
   the control-target-value setting unit sets the control target value proportional to the number of multiplexed wavelengths, and
   when there is a change in the number of multiplexed wavelengths, the controller changes the control target value, and sets a time period for measurement of the number of multiplexed wavelengths to a value smaller than a control time constant used when the feedback control of the variable optical attenuator is performed.

2. The optical relay device according to claim 1, further comprising a transmission delay unit is arranged between the number-of-multiplexed-wavelengths measuring unit and the variable optical attenuator to provide a predetermined delay to the wavelength-multiplexed light to be transmitted.

3. The optical relay device according to claim 2, wherein the transmission delay unit is an optical fiber having a predetermined length.

4. The optical relay device according to claim 2, wherein the transmission delay unit is a dispersion-compensating optical fiber having a predetermined length.

5. The optical relay device according to claim 1, further comprising a modulating unit that performs, when there is a change in the number of multiplexed wavelengths, a predetermined modulation on the wavelength-multiplexed light to transfer the change in the number of multiplexed wavelengths to downstream.

6. The optical relay device according to claim 1, further comprising:
   a modulation-component extracting unit that extracts a modulation component of the wavelength-multiplexed light, wherein
   the modulation-component extracting unit extracts the modulation component of the wavelength-multiplexed light to detect the change in the number of multiplexed wavelengths, and
   the control-target-value setting unit sets the control target value corresponding to the number of multiplexed wavelengths measured after the change in the number of multiplexed wavelengths is detected.

7. The optical relay device according to claim 1, wherein when there is the change in the number of multiplexed wavelengths in the wavelength-multiplexed light, the controller temporarily changes the control time constant used when the feedback control of the variable optical attenuator is performed to a value larger than a usual control time constant.

8. The optical relay device according to claim 7, wherein after temporarily changing the control time constant used in the feedback control of the variable optical attenuator to a value larger than the usual control time constant, the controller returns the control time constant to the usual control time constant after a lapse of a predetermined time.

9. An optical relay device that relays a wavelength-multiplexed light in which optical signals with different wavelengths are wavelength-multiplexed, the optical relay device comprising:
   a total-power measuring unit that measures total power of the wavelength-multiplexed light;
   a number-of-multiplexed-wavelengths measuring unit that measures number of multiplexed wavelengths in the wavelength-multiplexed light;
   a variable optical attenuator that attenuates the total power of the wavelength-multiplexed light;
   a control-target-value setting unit that sets a control target value corresponding to the number of multiplexed wavelengths measured by the number-of-multiplexed-wavelengths measuring unit;
   a controller that controls the variable optical attenuator based on the control target value; and
   an optical amplifier that performs an optical amplification with a constant gain regardless of power of the wavelength-multiplexed light, wherein
   the controller performs feedback control of the variable optical attenuator such that a result of measurement of the total power of the wavelength-multiplexed light meets the control target value,
   the total-power measuring unit is arranged between the variable optical attenuator and the optical amplifier, and
   the number-of-multiplexed-wavelengths measuring unit includes
     a demultiplexing unit that optically demultiplexes the wavelength-multiplexed light, and
     a measuring unit that measures power of each demultiplexed light.

10. The optical relay device according to claim 9, wherein the number-of-multiplexed-wavelengths measuring unit includes a light detecting unit that detects a presence of light in each waveband, and the light detecting unit detects the presence of light based on a result of comparison between a result of measurement of optical power in each waveband of the wavelength-multiplexed light measured by the number-of-multiplexed-wavelengths measuring unit and a preset determination threshold.

11. The optical relay device according to claim 9, wherein
the number-of-multiplexed-wavelengths measuring unit includes a light detecting unit that detects a presence of light in each waveband, and
the light detecting unit detects the presence of light based on a result of comparison between a maximum value of a result of the measurement of optical power in each waveband of the wavelength-multiplexed light measured by the number-of-multiplexed-wavelengths measuring unit and a determination threshold obtained by dividing the maximum value by a predetermined number equal to or larger than one.

12. An optical relay transmission system comprising:
a transmitting unit that transmits a wavelength-multiplexed light;
a receiving unit that receives the wavelength-multiplexed light;
transmission lines provided on a transmission path linking the transmitting unit and the receiving unit; and
an optical relay device that relays a wavelength-multiplexed light in which optical signals with different wavelengths are wavelength-multiplexed and is provided in at least one of a section between the transmitting unit and the transmission lines, a section between the transmission lines, and a section between the transmission lines and the receiving unit, the optical relay device including
a total-power measuring unit that measures total power of the wavelength-multiplexed light,
a number-of-multiplexed-wavelengths measuring unit that measures number of multiplexed wavelengths in the wavelength-multiplexed light,
a variable optical attenuator that attenuates the total power of the wavelength-multiplexed light,
a control-target-value setting unit that sets a control target value corresponding to the number of multiplexed wavelengths measured by the number-of-multiplexed-wavelengths measuring unit,
a controller that controls the variable optical attenuator based on the control target value, and
an optical amplifier that performs an optical amplification with a constant gain regardless of power of the wavelength-multiplexed light, wherein
the controller performs feedback control of the variable optical attenuator such that a result of measurement of the total power of the wavelength-multiplexed light meets the control target value,
the total-power measuring unit is arranged between the variable optical attenuator and the optical amplifier,
the control-target-value setting unit sets the control target value proportional to the number of multiplexed wavelengths, and
when there is a change in the number of multiplexed wavelengths, the controller changes the control target value, and sets a time period for measurement of the number of multiplexed wavelengths to a value smaller than a control time constant used when the feedback control of the variable optical attenuator is performed.

13. The optical relay transmission system according to claim 12, wherein
the transmitting unit includes a modulating unit that modulates light at transmission wavelengths using different frequencies, and
the number-of-multiplexed-wavelengths measuring unit includes an extracting unit that electrically extracts a modulation component superimposed on the wavelength-multiplexed light.

14. The optical relay transmission system according to claim 13, wherein a relation in magnitude of $T_{AGC} < 1/f < Tn < Tc$ is satisfied, where $T_{AGC}$ is a time constant for controlling a gain of the optical amplifier, f is a modulation frequency used in the modulating unit, Tn is the time period for measurement of the number of multiplexed wavelengths used in the number-of-multiplexed-wavelengths measuring unit, and Tc is the control time constant used when the feedback control of the variable optical attenuator is performed.

15. The optical relay transmission system according to claim 13, wherein
the number-of-multiplexed-wavelengths measuring unit includes a light detecting unit that detects a presence of light, and
the light detecting unit detects the presence of light based on a result of comparison between a result of measurement of optical power in each waveband of the wavelength-multiplexed light measured by the number-of-multiplexed-wavelengths measuring unit and a preset determination threshold.

16. The optical relay transmission system according to claim 13, wherein
the number-of-multiplexed-wavelengths measuring unit includes a light detecting unit that detects a presence of light in each waveband, and
the light detecting unit detects the presence of light based on a result of comparison between a maximum value of a result of the measurement of optical power in each waveband of the wavelength-multiplexed light measured by the number-of-multiplexed-wavelengths measuring unit and a determination threshold obtained by dividing the maximum value by a predetermined number equal to or larger than one.

17. The optical relay device according to claim 1, wherein the wavelength-multiplexed light attenuated by the variable optical attenuator is non-amplified.

18. The optical relay device according to claim 1, wherein the total-power measuring unit is directly connected to an input of the optical amplifier.

19. The optical relay device according to claim 1, further comprising a transmission delay unit that provides a predetermined delay to the wavelength-multiplexed light transmitted to the variable optical attenuator.

* * * * *